United States Patent [19]
Kurz et al.

[11] Patent Number: 5,346,441
[45] Date of Patent: Sep. 13, 1994

[54] COMBINATION OF TWO-STATOR-ROTOR UNITS WITH A CONNECTING GEAR UNIT THEREBETWEEN

[75] Inventors: Walter Kurz, Durach; Reinhard Deppert, Gochsheim; Wolfgang Baier, Obbach; Manfred Lutz, Schweinfurt, all of Fed. Rep. of Germany

[73] Assignee: Fichtel & Sachs AG, Schweinfurt, Fed. Rep. of Germany

[21] Appl. No.: 12,592

[22] Filed: Feb. 3, 1993

[30] Foreign Application Priority Data

Feb. 4, 1992 [DE] Fed. Rep. of Germany ....... 9201326

[51] Int. Cl.$^5$ .............................................. F16H 3/44
[52] U.S. Cl. ........................................ 475/116; 474/72
[58] Field of Search ........................... 474/72; 475/116

[56] References Cited
FOREIGN PATENT DOCUMENTS

| | | |
|---|---|---|
| 0028140 | 5/1981 | European Pat. Off. . |
| 3740082 | 6/1989 | Fed. Rep. of Germany . |
| 4009448 | 7/1990 | Fed. Rep. of Germany . |
| 1155079 | 6/1989 | United Kingdom . |
| 2213217 | 8/1989 | United Kingdom . |

Primary Examiner—Dirk Wright
Attorney, Agent, or Firm—Brumbaugh, Graves, Donohue & Raymond

[57] ABSTRACT

According to an illustrative example of the present invention, an internal combustion engine is provided with a gear box. This gear box is driven by an end portion of the crank shaft. A belt pulley is provided around the axis of the gearbox. The belt pulley drives through a belt an electric power generator. The gear box contains a planetary gear of variable transmission ratio. The change of transmission ratio is effected by an hydraulically operated clutch. The hydraulically operated clutch is actuated by a hydraulic actuating device. The hydraulic actuating device is actuated by oil pressure. The oil pressure is obtained by a hydraulic pump integrated into the gear box. Further components of the circuitry containing the pump and the hydraulic actuating device are provided outside the gear box. These external components are carried by a carrier plate. This carrier plate contains side by side channels of the hydraulic circuitry. Simultaneously, the carrier plate acts as a torque support for the gear box which is mounted on the end portion of the crank shaft.

27 Claims, 4 Drawing Sheets

COMBINATION OF TWO-STATOR-ROTOR UNITS WITH A CONNECTING GEAR UNIT THEREBETWEEN

BACKGROUND OF THE INVENTION

In motor-vehicles the internal combustion engine drives an auxiliary device, such as an electric power generator. A connecting gear unit is operatively interconnected between the internal combustion engine and auxiliary device. This connecting gear unit has a changeable transmission ratio. By change of the transmission ratio the r.p.m. of the auxiliary device can be approximated to a desired r.p.m. in spite of large variations of the r.p.m. of the internal combustion engine during operation.

The operation and control of the connecting gear unit requires a circuitry comprising electric and/or hydraulic and/or pneumatic circuit components. Frequently, it is desirable to provide at least part of such components outside of the connecting gear unit. If certain components are provided outside the gear unit, it is necessary to provide connecting means between internal components provided within the connecting gear unit and external components provided outside the gear unit. These connecting means should be arranged in such a way as to require a minimum of space in the engine compartment of e.g. a motor-vehicle. This requirement is particularly important as in many cases the speed change operations in the connecting gear unit are not only dependent on the r.p.m. of the respective engines but are additionally responsive to other parameters of the engine, the motor-vehicle, the driving conditions and the environmental conditions.

STATEMENT OF THE PRIOR ART

In German patent publication 37 40 082 A1, corresponding to published British patent application 22 13 217 A, and in German patent publication 40 09 448, oil circuitries are provided for the operation of the connecting gear unit. Certain components of these oil circuitries are provided outwards of the connecting gear unit and thus, oil channels are necessary for connecting said external components of the oil circuitry with the internal components of the oil circuitry located inside the connecting gear unit. In these known constructions, oil channels occupy more space than is usually available within the engine compartment of a motor-vehicle.

OBJECT OF THE INVENTION

The object of the invention is to arrange operating circuitry means for a connecting gear unit such that a minimum of space is required for such circuitries, particularly in the axial direction of the crank shaft of a motor-vehicle internal combustion engine.

SUMMARY OF THE INVENTION

A combination of a first stator-rotor unit having first stator means and first rotor means rotatable about a first rotor axis, of a second stator-rotor unit having second stator means and second rotor means rotatable about a second rotor axis, and of a connecting gear unit is provided. This connecting gear unit has a gear means compartment, a first terminal member connected for common rotation with the first rotor means about the first rotor axis, a second terminal member connected for common rotation with the second rotor means and transmission-ratio-changeable transmission gear means within the gear means compartment. Operating circuitry means having a plurality of circuit components are allocated to the connecting gear unit. An internal group of circuit components is accommodated within the gear means compartment. An external group of circuit components is provided outside the gear means compartment. The external group of circuit components is carried by a plate-shaped carrier unit having a main plane substantially orthogonal with respect to the first rotor axis. This carrier unit is connected to a stationary compartment confining unit participating in confining the gear means compartment. The plate-shaped carrier unit includes a plurality of connecting channels. These connecting channels have longitudinal axes substantially lying in said main plane. These connecting channels connect respective internal and external circuit components.

By such arrangement of the connecting channels, the axial space requirement along the first rotor axis can be reduced to the necessary width of one single channel. This axial width can be further reduced by forming the cross-sectional areas of the channels such as to have a short axis in parallel with the first rotor axis.

Simultaneously, the carrier unit may carry at least a part of the external components so that the space requirement is further reduced by avoiding special carriers for external circuit components. The term "circuit components" is to be understood in a very broad sense. Circuit components are all components of hydraulic, electric and pneumatic circuitries including simple chambers or spaces which contain e.g. hydraulic or pneumatic operating media.

The plate-shaped carrier unit may have a plate thickness substantially corresponding to the hollow cross-sectional area of the connecting channels increased by the necessary wall thickness of channel confining walls confining the connecting channels. The necessary wall thickness may be dependent on the internal pressure within the connecting channels and on the structural rigidity required by the carrier unit.

The plate-shaped carrier unit may be elongate in a direction substantially radial with respect to the first rotor axis, in which case the connecting channels may be substantially parallel to each other along at least a part of their respective lengths.

The plate-shaped carrier unit may be connected by torque support means with the first stator means for preventing rotation of the stationary compartment confining unit about the first rotor axis. Thus, the plate-shaped carrier unit can additionally fulfill the function of a torque support means for the connecting gear unit.

The operating circuitry means may comprise e.g. a liquid reservoir chamber, a pump unit, a liquid space within said gear means compartment, a liquid-operated clutch actuation unit within the gear means compartment for actuating a transmission-ratio-change-clutch of the transmission-ratio-changeable transmission gear means and a pump delivery control valve unit for providing variable pump delivery pressure, the variable pump delivery pressure being operatively connected with the liquid-operated clutch actuation unit. Moreover, filter means may be provided within the liquid circuitry for cleaning the liquid. Thus, the liquid may be used for a long time of operation. The liquid may in particular be a hydraulic oil which can simultaneously be used for lubrication of the mechanical components which require lubrication. It is of particular interest to have the liquid circuitry separated from other circuitries of the internal combustion engines and of the motor-vehicle. So, a separated volume of liquid may be contained within the circuitry and this volume of oil may be such that it is sufficient for the expected life-time of the engine and/or the motor-vehicle.

The pump unit and the liquid-operated clutch actuation unit may be provided within the gear means compartment, whereas the reservoir chamber and the pump delivery control valve unit may be external circuit components. In such case, the arrangement may be as follows: a first liquid conducting channel connects pump delivery means with inlet means of the pump delivery control valve unit. A second liquid-conducting channel connects outlet means of the pump delivery control valve unit with the gear means compartment. A third liquid conducting channel connects the reservoir chamber with pump feed means. A fourth liquid conducting channel connects the liquid space in the compartment with a liquid space within the reservoir chamber.

In addition, a gas exchange channel may connect a liquid-free space of the compartment with a liquid-free space of the reservoir chamber. This gas exchange channel may have the function of a compensating line which always ensures that the liquid level in the gear means compartment is maintained at a level sufficient for the function of the gear means.

At least part of the connecting channels may be connected to respective circuit components by connecting bores substantially parallel with the first rotor axis. As far as these bores are in connection with internal components, these bores may be substantially arranged on a circle about the first rotor axis. These connecting bores may be in alignment with respective bores of the stationary compartment confining unit. The axial bores within the stationary compartment confining unit may be continued within stationary parts of the gear unit or through rotatable connection means to rotating parts of the gear unit in order to be finally connected with the respective liquid requiring circuitry components.

The first stator-rotor unit may have stator wall means substantially orthogonal with respect to the first rotor axis. These stator wall means may be e.g. an end wall of an internal combustion engine through which an end portion of a crank shaft extends. The gear unit may then have a first end portion adjacent a side of said stator wall means remote from said first rotor means and a second end portion on the same side of the stator wall means but more remote therefrom along the first rotor axis. The plate-shaped carrier unit may then be located adjacent one of the first and second end portions and preferably adjacent the second end portion.

The external circuit components may be located on the plate-shaped carrier unit in overlapping relationship with the connection gear unit along said first rotor axis. This is of considerable interest in view of saving space. It is, however, also possible to provide at least part of the external components on the side of the plate-shaped carrier unit which is remote from the stator wall means, when the plate-shaped carrier unit is provided adjacent the second end portion of the gear unit. This is particularly true for such components which require an occasional or periodical service. These components may in such arrangement be more easily accessible and exchangeable.

The second terminal member of the connecting gear unit may comprise a belt pulley or a chain sprocket rotatable about the first rotor axis. In this case, a respective closed-loop belt or chain may connect the belt pulley or chain sprocket with a further belt pulley or chain sprocket, respectively, of the second rotor means. In such an arrangement, at least part of the external group of components may be located inside the closed-loop belt or chain, respectively. This is of considerable interest again in view of saving space within an engine compartment.

The plate-shaped carrier unit may comprise a base plate with the connecting channels recessed therein and a cover plate covering the connecting channels of the base plate.

Alternatively, the plate-shaped carrier unit may comprise two cover plates and an intermediate plate therebetween. In this case, the intermediate plate may be provided with slots therethrough. These slots are then covered by the cover plates so as to establish said connecting channels in cooperation with the cover plates.

Generally spoken, the plate-shaped carrier unit may comprise a plurality of sandwiched layer members, preferably two or three. These layer members may be soldered to each other or bonded to each other by adhesive means or welded to each other.

The plate-shaped carrier member may be exposed to heat exchange with surrounding air. This is of particular interest in case of the liquid being heated within the connecting gear unit by structural members rotating therein. Such, the temperature within an oil bath of the connecting gear unit may be kept low.

At least one of the sandwiched layer members may be integrally formed with chamber wall means confining at least one of the reservoir chamber and a valve unit chamber.

At least one of the sandwiched layer members may be obtained by a non-cutting shaping process, such as casting, die-casting, coining, stamping or deep-drawing.

The first stator-rotor unit may be an internal combustion engine, in which case the second stator-rotor unit may be an auxiliary power-driven unit, such as an electric power generator. In this application of the invention, a plurality of auxiliary units may be driven from the second terminal member by one or by a plurality of belts or chains.

Alternatively, the first stator-rotor unit may be an auxiliary power-driven unit of an internal combustion engine, whereas the second stator-rotor unit may be the internal combustion engine. This latter arrangement is of particular interest, if only one power-consuming auxiliary unit is to be driven from the engine through a gear unit with variable transmission ratio. This is particularly true for electric power generators.

The invention further comprises for a combination as defined above a connecting gear unit having a gear means compartment, a first terminal member connectable for common rotation with the first rotor means about the first rotor axis, a second terminal member connectable for common rotation with the second rotor means about the second rotor axis and transmission-ratio-changeable transmission gear means within the gear means compartment.

In this gear unit, the external group of circuit components is carried by a plate-shaped carrier unit having a main plane substantially orthogonal with respect to said first rotor axis and being connected or connectable to a stationary compartment confining unit participating in confining the gear means compartment. This plate-shaped carrier unit includes a plurality of connecting channels. Those connecting channels have longitudinal axes substantially lying in the main plane. It is evident that the connecting channels are sealingly separated from each other, when they form liquid or gas conducting channels of a different function.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE DRAWINGS

Figure 1:
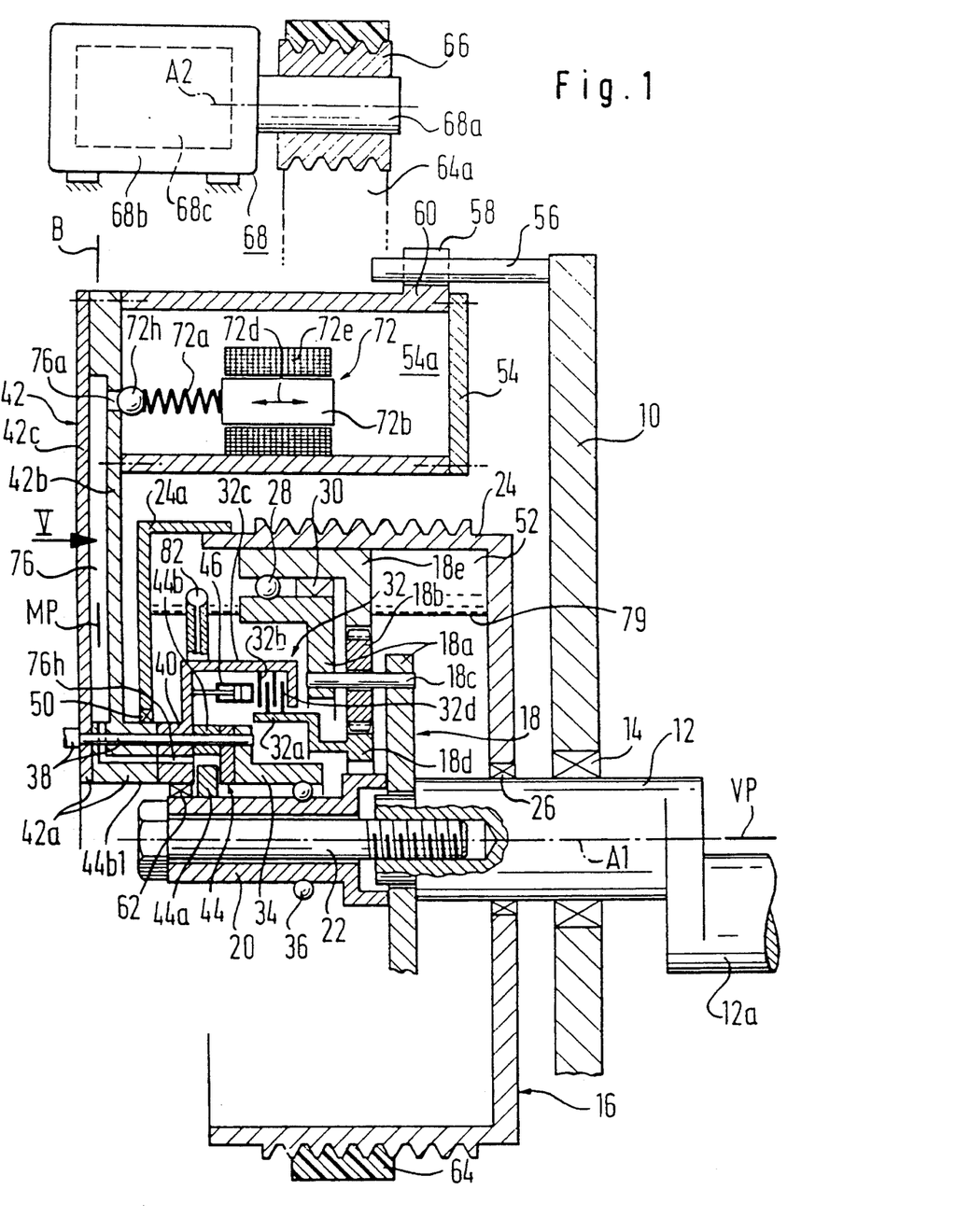
FIG. 1 shows a longitudinal section of a connecting gear box in operative connection with a combustion engine and an electric power generator, said section containing the axis of the crank shaft of the internal combustion engine.

In FIG. 1, an end wall of an internal combustion engine is designated by 10. A crank shaft end portion 12 of the internal combustion engine extends through the end wall 10 by sealing means 14. A connecting gear unit 16 is mounted in coaxial arrangement on the crank shaft end portion 12. The gear unit 16 comprises planetary gear means 18. A planet carrier 18a is fastened on the crank shaft end portion 12 by a sleeve member 20 and a tension bolt 22. The planet carrier 18a carries several planet wheels 18b on bolts 18c. The planet wheels 18b mesh with a sun wheel 18d and with a ring wheel 18e. The ring wheel 18e is fastened to a belt pulley 24 which is sealed by a sealing ring 26 against the crank shaft end portion 12. The ring wheel 18e is rotatably mounted on the planet carrier 18a by a ball bearing 28. A free wheel unit 30 is provided between the planet carrier 18a and the ring wheel 18e. The sun wheel 18d is carried and centered by the planet wheels 18b. The sun wheel 18d is connected for common rotation with an inner clutch cage 32a of a clutch unit 32. A hub member 34 is rotatably mounted on the sleeve member 20 by a ball bearing 36. The hub member 34 is combined by bolt members 38 with a cage hub member 40 and the central part 42a of a carrier unit 42. An oil pump 44 comprises a rotor member 44a and a stator member 44b fastened to the hub member 34 by the bolt members 38. The oil pump 44 is e.g. of the type as described in German patent publication 37 40 082 A1 and the corresponding British patent application 22 13 217 A (see FIG. 2 of the German patent publication). A clutch actuating device 46 is supported by the cage hub member 40. The clutch unit 32 comprises outer clutch plates 32b fastened on an outer cage member 32c which is integral with the cage hub member 40. The outer clutch plates 32b are non-rotatable with respect to the outer cage member 32c but axially movable with respect thereto. Inner clutch plates 32d are non-rotatably mounted on the inner clutch cage 32a. By the clutch actuating device 46 the clutch plates 32b and 32d can be pressed in frictional engagement such that the sun wheel 18d is rotationally fixed with respect to the cage hub member 40 and the hub member 34.

The belt pulley 24 is closed by a cover member 24a which is sealed by a sealing ring 50 with respect to the central part 42a of the carrier unit 42. A gear means compartment 52 is defined by the belt pulley 24 and the cover member 24a. The carrier unit 42 carries an oil tank 54 which contains an oil reservoir chamber 54a. The end wall 10 carries a torque support member 56 engaging into a slot 58 of a tank-side torque support member 60 connected to the oil tank 54 and thereby to the carrier unit 42. Such, the carrier unit 42 is non-rotatably fixed with respect to the end wall 10 and further, the hub member 34, the cage hub member 40 and the central part 42a of the carrier unit 42 form a stationary compartment confining unit participating in the formation of the compartment 52. A further sealing ring 62 is provided between this stationary compartment confining unit and the sleeve member 20.

A belt 64 is laid upon the belt pulley 24 and is further laid upon a belt pulley 66. This further belt pulley 66 is fastened to an input shaft 68a of a stationary electric generator 68 having a stator housing 68b and a rotor 68c with an axis A2. The tank 54 is provided between the belt pulley 24 and the belt pulley 66 and located between the two sections of the belt 64 one of which is designated by 64a. The crank shaft of the internal combustion engine is designated by 12a and has an axis A1.

When the clutch unit 32 is closed by the clutch actuating device 46 urging the clutch plates 32b and 32d in frictional engagement, the sun wheel 18d is kept stationary and cannot rotate, this locking of the sun wheel 18d being obtained through the mechanical chain 56,58,54,42,42a,38,40,32c,32b, 32d,32a. The crank shaft end portion 12 drives the planet carrier 18a. The planet wheels 18b mesh both with the stationary sun wheel 18d and with the ring wheel 18e. The ring wheel 18e is rotated with a r.p.m. larger than the r.p.m. of the crank shaft end portion 12. The free wheel unit 30 allows a rotation of the ring wheel 18e faster than the r.p.m. of the planet carrier 18a. The belt pulley 24 is connected for common rotation with the ring wheel 18e. The belt pulley 24 drives through the belt 64 the electric generator 68. This mode of operation exists at a low r.p.m. of the crank shaft 12a so that the electric generator 68 is driven with an increased r.p.m. as compared to the r.p.m. of the crank shaft end portion 12 due to the transmission ratio of the planetary gear means 18. So, the generator 68 can be driven at a relatively high r.p.m. in spite of the relatively low r.p.m. of the crank shaft 12a.

When the crank shaft 12a adopts a predetermined higher r.p.m., it is desirable to select another transmission ratio in the planetary gear means 18 such that the r.p.m. of the electric generator 68 is not too high as a result of the higher r.p.m. of the crank shaft 12a. Therefore, the clutch unit 32 is opened through the clutch actuating device 46. The clutch plates 32b and 32d are disengaged so that the sun wheel 18d is not further stationary. Now, the planet carrier 18a driven by the crank shaft end portion 12 drives through the free wheel unit 30 the ring wheel 18e with the r.p.m. of the crank shaft 12a. This is the direct drive. The planetary gear means 18 comprising the planet carrier 18a, the sun wheel 18d, the planet wheels 18b and the ring wheel 18e rotate as a unit. The belt pulley 24 is again driven by the ring wheel 18e and drives the input shaft 68a of the electric power generator 68. So, the electric power generator 68 is driven at a relatively small r.p.m. in spite of the increased r.p.m. of the crank shaft 12a.

Figure 2:
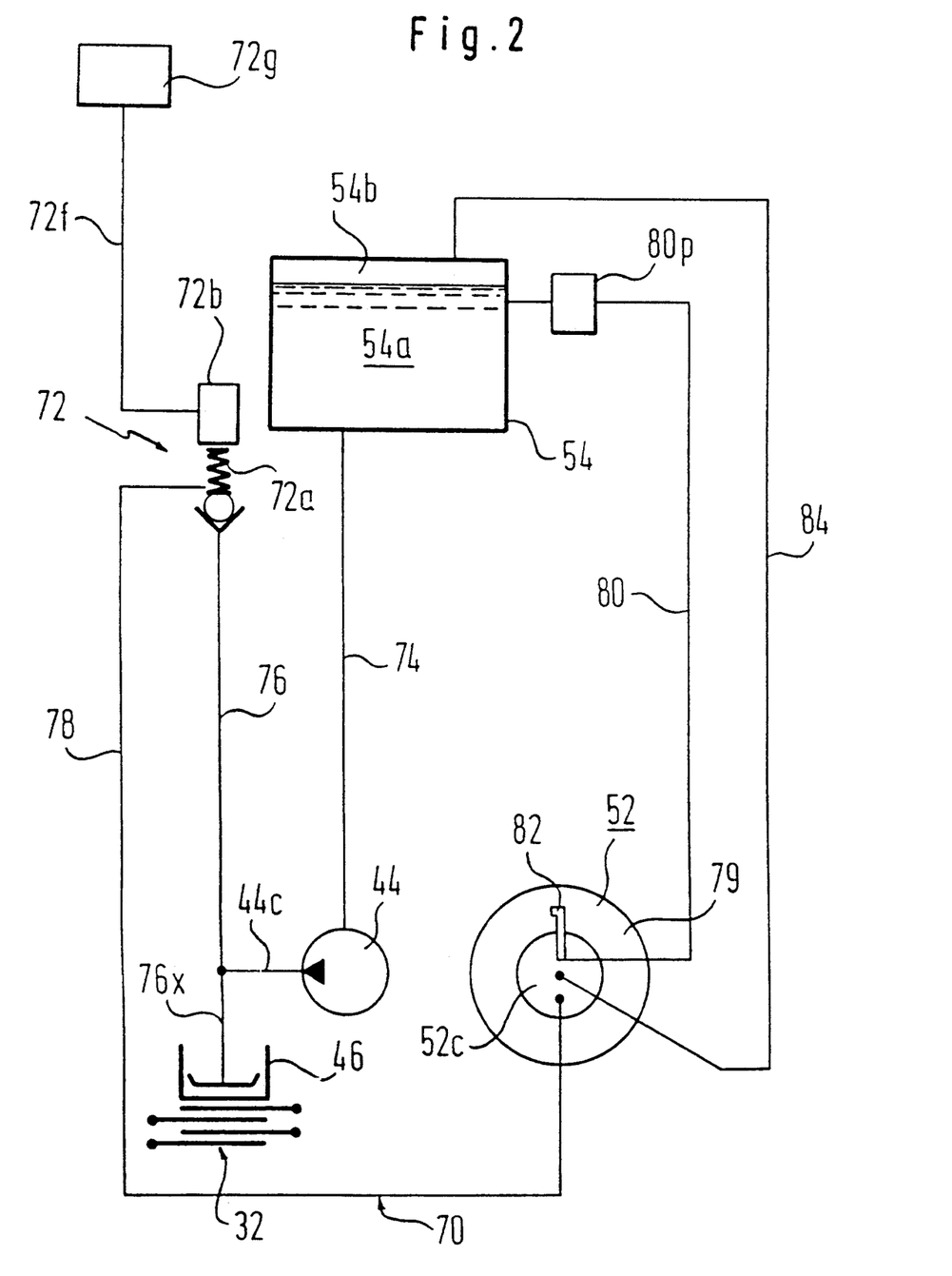
FIG. 2 shows a circuitry diagram showing the oil lines and air lines between the connecting gear unit and some external circuit components.

The clutch actuating device 46 is a hydraulic clutch actuating device preferably of annular shape around the axis A1 of the crank shaft 12a. The hydraulic circuitry of the clutch actuating device is shown in FIG. 2. This circuitry is designated by 70. One recognizes the pump 44, the tank 54 with the oil reservoir chamber 54a, the gear means compartment 52 of the connecting gear unit 16 and a control valve unit 72. The pump 44 receives oil through a line 74. The pressure exit 44c of the pump 44 is connected through a line 76 with both the control valve unit 72 and the clutch actuating device 46. The control valve unit 72 is biased towards a closing position by a helical compression spring 72a. The helical compression spring 72a is charged by an electro-magnetic armature 72b in the sense of increasing the biasing action of the compression spring 72a. Such, an increased pressure exists in the line 76 at the exit 44c of the pump 44. This increased pressure acts upon the clutch actuating device 46 such as to lock the sun wheel 18d against rotation. This means that the transmission ratio of the planetary gear means is increased, i.e. the ring wheel 18e rotates with an increased r.p.m. as compared to the r.p.m. of the crank shaft 12a. The liquid from the line 76, nevertheless, escapes through the control valve unit 72 and flows back through a line 78 to the gear means compartment 52. A certain volume of oil is always present within the gear means compartment 52 and forms a rotating oil ring 79 within the compartment 52. A stationary oil collector 82 is fastened on the cage hub member 40 and immerges into the rotating oil ring 79. By the Pitot pressure occurring at the oil collector 82 oil is returned through a line 80 from the gear means compartment 52 to the oil reservoir chamber 54a. An air exchange line 84 connects an air space 54b of the oil tank 54 with an air space 52c of the gear means compartment 52. The details of the control valve unit are shown in FIG. 1. The armature 72b is movable in the direction of arrow 72d by an electric coil 72e. The coil 72e is energized by an electric line 72f which is controlled by an electric control unit 72g. The electric control unit 72g is fed by signals representing the r.p.m. of the crank shaft 12a and other parameters as mentioned above, e.g. a signal of need showing that the electric power generator should be driven at an increased r.p.m. in view of increased power requirements to the generator 68.

As long as the armature 72b is in its left-hand position as shown in FIG. 1, the ball 72h is pressed with a high biasing force against a bore 76a of the line 76 provided within the plate-shaped carrier unit 42. This line 76 is connected with the pump 44 through an axial bore 76 extending through the central part 42a of the carrier unit 42. The high biasing force on the ball 72h results in a high pressure within the line 76. This high pressure is transmitted to the clutch actuating device 46 through further axial bores within the central part 42a and the cage hub member 40 corresponding to line 76x of FIG. 2. By the high pressure of the oil in the line 76 the clutch 32d is closed so that the sun wheel 18d is locked against rotation. If the electric control unit 72g gives an electric signal to the coil 72e providing a movement of the armature 72b to the right in FIG. 1, the biasing force provided by the compression spring 72a is reduced and the pressure within the line 76 is also reduced. Such a reduced pressure is applied to the clutch actuating unit 46 and the clutch unit 32 is released by clutch release spring means (not shown). Such, the sun wheel 18d becomes freely rotatable and the direct drive as described above is selected. As soon as the clutch unit 32 is released so as to permit a free rotation of the sun wheel 18d about the axis A1, the direct transmission mode is used again.

It can be seen from FIG. 1 that the line 76 is provided within the plate-shaped carrier unit 42. This plate-shaped carrier unit 42 comprises a base plate 42b and a cover plate 42c. The base plate 42b is in more detail shown in FIG. 5. In the base plate 42b there are provided longitudinal grooves 74g, 76g, 78g, 80g and 84g, which form the respective channels 74, 76, 78, 80 and 84. These channels are closed by the cover plate 42c as shown in FIG. 1 so that they are sealingly separated from each other.

Figure 5:
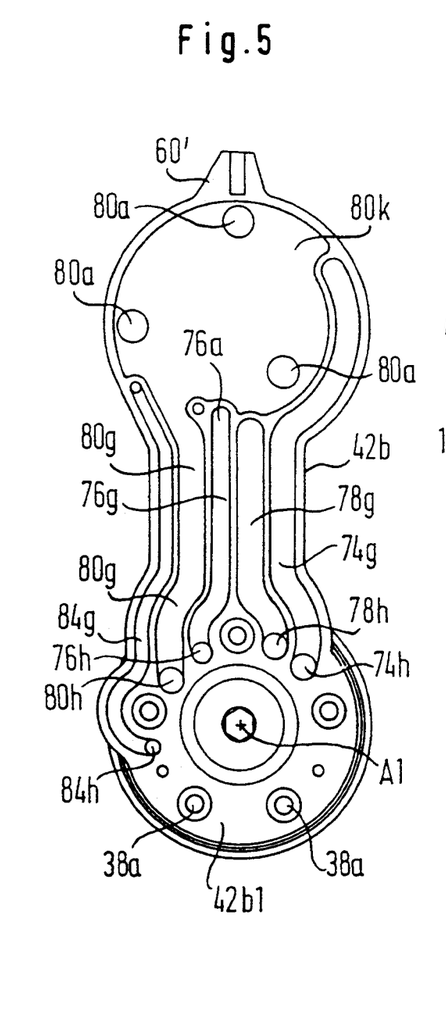
FIG. 5 shows a sandwich plate of a plate-shaped carrier unit in the direction V of FIG. 1

From FIG. 5 one can see that the grooves and correspondingly also the channels are provided side by side with their longitudinal axes located in a common main plane MP which is indicated in FIG. 1. So, the plate-shaped carrier unit 42 can be formed with a very small thickness along the axial direction A1 of FIG. 1. Evidently it is not absolutely necessary that the axes of the channels 74, 76, 78, 80 and 84 are exactly contained in the common main plane MP. One can also say that the wall thickness of the plate-shaped carrier unit is at a minimum because the channels 74, 76, 78, 80 and 84 are arranged side by side along an arc extending around the axis A1. There are no channels which are adjacent each other along the axis A1. The base plate 42b has, as one can see from FIG. 5, a substantial circular base plate part 42b1 which forms together with a corresponding part of the cover plate 42c the central part 42a of the plate-shaped carrier unit 42. In this circular base plate part 42b1 there are provided axial bores 74h, 76h, 78h, 80h and 84h. It is to be noted that these bores are arranged along a substantially circular line around the axis A1 as seen in FIG. 5. These bores are connection bores which connect the respective channels 74, 76, 78, 80, 84 with the components as shown in FIG. 2. All these bores 74h, 76h, 78h, 80h and 84h are in alignment with corresponding axial bores leading to the respective components within the compartment 52. The circular arrangement of the bores 74h, 76h, 78h, 80h, 84h in the circular base plate part 42b of FIG. 5 allows a very convenient distribution of the respective fluid paths within the compartment 80 and a slim form of the base plate 42b as shown in FIG. 5 also in plane orthogonal with respect to the axis A1.

The upper ends of the grooves 74g, 76g, 78g, 80g and 84g in FIG. 5 are connected by similar axial bores to the tank 54 and to the control valve unit 72. One can recognize e.g. in FIG. 5 at the upper end of the groove 76g the axial bore 76a which is also shown in FIG. 1 and is in fluid connection with the control valve unit 72. Further, one can see in FIG. 5 at the upper end of the groove 89g an expansion space 80k which is connected through bores 80a with the oil reservoir chamber 54a within the oil tank 54. This expansion space is very helpful because it allows a separation of oil and air which is present in a foam mixture flowing through the channel 80 to the oil reservoir chamber 54a. At the upper end of the base plate 42b one can recognize a torque support member 60'.

It is readily to be understood that a sealing plate may be provided between the base plate 42b and the cover plate 42c.

Figure 4:
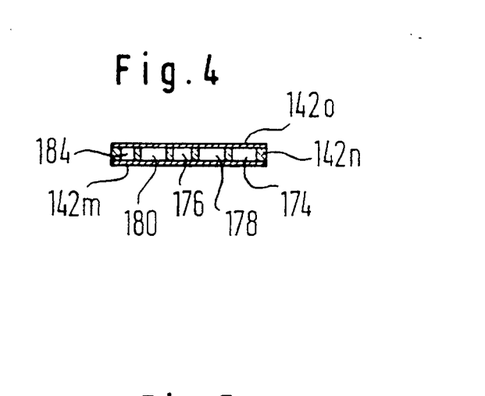
FIG. 4 shows a partial section according to a section line IV—IV of FIG. 3.

In FIG. 4, one can also recognize the holes 38a for the tension bolts 38.

The base plate 42b and the cover plate 42c may be connected by welding, soldering or adhesive bonding.

It is understandable that through the carrier unit 42 the stationary compartment confining unit consisting of the central part 42a, the cage hub member 40 and the hub member 34 are secured against rotation with respect to the side wall 10 of the internal combustion engine.

It is further to be noted that the oil contained within the oil ring 40 within compartment 52 is useful for lubrication of the various parts of the planetary gear means 18, particularly of those parts which are in meshing or frictional engagement with each other. The volume of oil within the compartment 52 is dimensioned such that the oil ring 79 lubricates e.g. the free wheel unit 30 whereas other lubricant requiring locations may be lubricated by further lubricant channels not shown.

It is to be noted that the tank 54 as shown in FIG. 1 is in axial overlapping relationship with the connecting gear unit 16 between the two sections of the belt 64a. This is a most space-saving arrangement.

Figure 3:
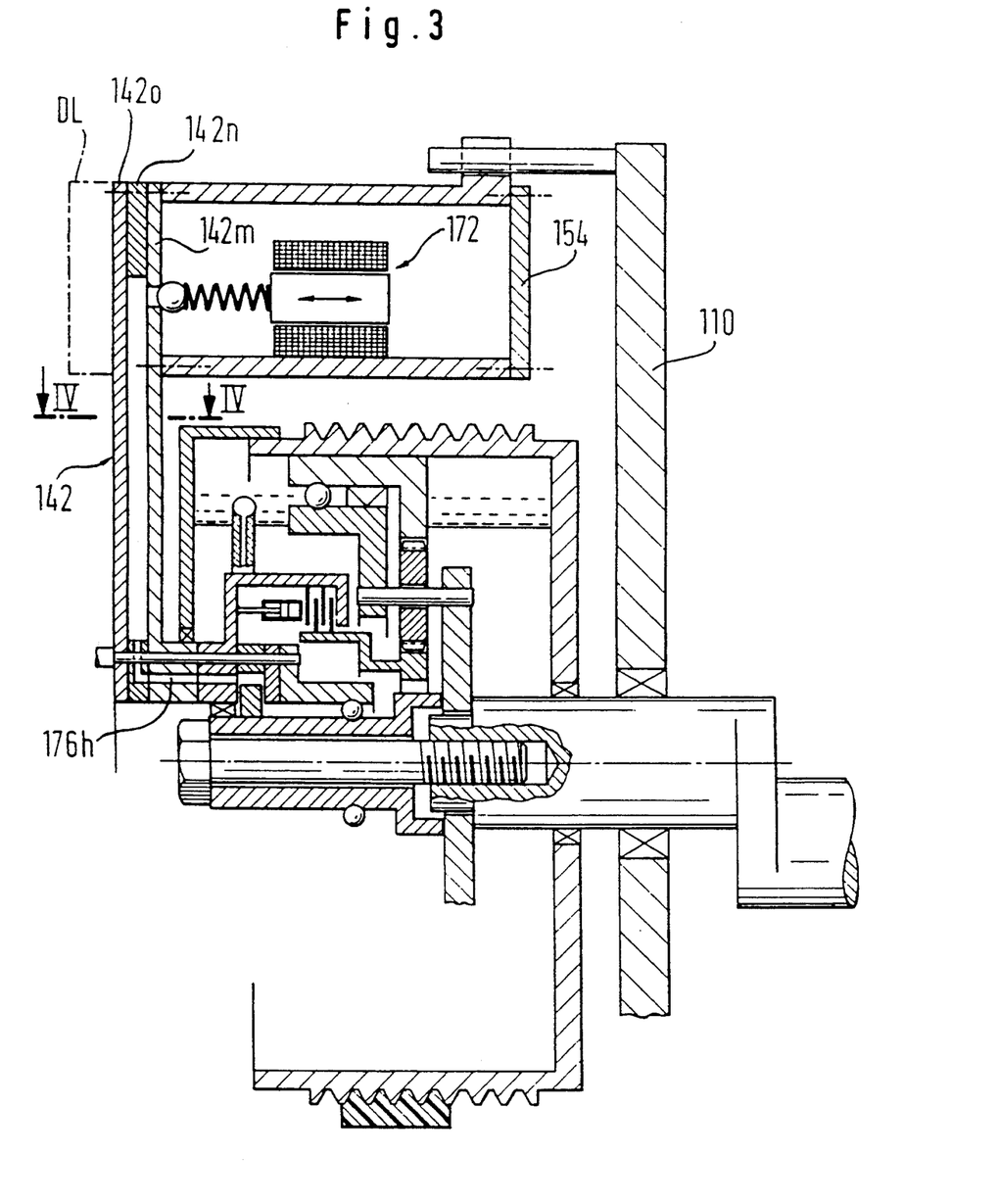
FIG. 3 shows a modified embodiment modified with respect to FIG. 1 by a different structure of a plate-shaped carrier unit.

The embodiment of FIG. 3 differs from the embodiment of FIGS. 1 and 2 only in that the plate-shaped carrier unit 142 consists of three sandwiched plate members 142m, 142n and 142o. The plate member 142m may be provided with the bores as shown in FIG. 4 at 74h, 76h, 78h, 80h, 84h, only bore 176h being shown in FIG. 3. In this embodiment of FIG. 3, the profiles of the channels are provided in the middle plate 142n. The profiles may be identic with the profiles as shown in FIG. 5, however, the profiles may extend completely through the sandwich plate 142n so that the channels are confined by the cooperating sandwiched plates 142m, 142n and 142o.

One can see from FIG. 4 the channels 174, 176, 178, 180 and 184 which have the same functions as the channels 74, 76, 78, 80 and 84 according to FIG. 2. One can further see from FIG. 4 the sandwiched arrangement of the three sandwich plated 142m, 142n and 142o according to FIG. 3.

In FIG. 3, there is further indicated by dotted line DL that the tank 154 and the control valve unit 172 may also be provided on the left-hand side of the plate-shaped carrier unit 142, i.e. on the side of this carrier unit which is remote from the engine housing wall 110.

One can easily understand that the arrangement of the belt 64 as shown in FIG. 1 allows an easy replacement of the belt without considerable disassembling steps.

Figure 6:
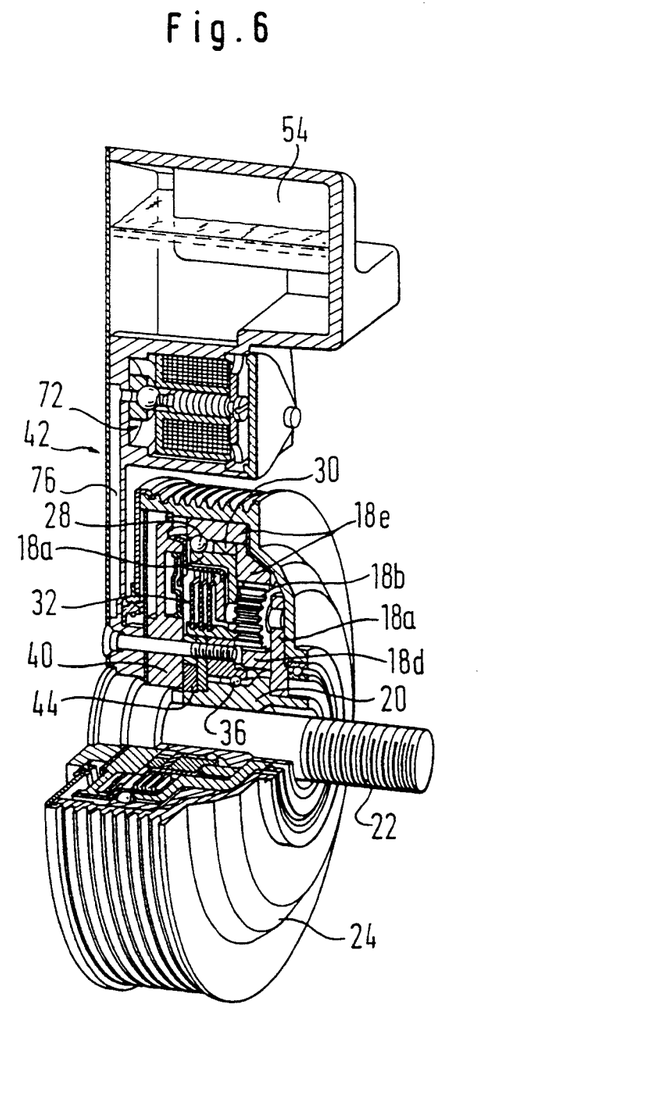
FIG. 6 shows an isometric illustration of a connecting gear unit partially in section and corresponding in principle to the embodiment of FIG. 1.

In FIG. 6, there is shown an isometric view of a realistic embodiment of an arrangement similar to FIG. 1. Analogous parts are designated by the same reference numerals as in FIG. 1. The bolt 22 is intended for connecting the device in FIG. 6 to the end portion of a crank shaft as shown in FIG. 1.

In FIG. 2, one can recognize that a filter 80p may be provided in the oil circuitry, e.g. in the line 80. This filter may be also located within or adjacent the oil tank 54.

It is to be noted that all circuit components which are not necessarily provided within the compartment 52 may be located on the plate-shaped carrier unit 42 as shown in FIGS. 1, 3 and 6.

Referring now again to FIG. 1 it is to be noted that the direction of the plate-shaped carrier unit 42 with respect to a horizontal plane P of the motor-vehicle designated VP is freely selectable. Preferably, however, the direction of the radial axis B of the carrier unit 42 is horizontal or extends downwards from the axis A1.

It is to be noted that the plate-shaped carrier unit 42 is freely accessible to cooling air within the engine compartment of a motor-vehicle. It may be exposed to the cooling action of a fan. So, the oil flowing through the channels 74, 76, 78 and 80 can be cooled.

It should be noted that at least parts of the tank 54 or of a separate housing accommodating the control valve unit may be integrally shaped with at least one of the sandwiched plates of the plate-shaped carrier unit 42.

The torque supporting means at 56, 58, 60 in FIG. 1 is of a very simple construction because the connecting gear unit 16 is basically carried by the crank shaft end portion 12. It should be observed, however, that the torque support means 56,58,60 should allow a certain play which allows to compensate for vibrations of the crank shaft 12a.

It should be further noted that while the arrangement of the channels side by side within the carrier unit 42 is of great advantage for saving space, the idea of providing the external components inside the loop defined by the belt 64 can be used also independently of this specific arrangement of the channels within the carrier unit 42. Therefore, this relative arrangement of the closed loop belt 64 and the components such as 54 should be protected independently of the special arrangement of the channels within the carrier unit 42.

While specific embodiments of the invention have been shown and described in detail to illustrate the application of the inventive principles, it will be understood that the invention may be embodied otherwise without departing from such principles.

We claim:

1. A combination of a first stator-rotor unit (10,12a) having first stator means (10) and first rotor means (12a) rotatable about a first rotor axis (A1), of at least one second stator-rotor unit (68) having second stator means (68b) and second rotor means (68c) rotatable about a second rotor axis (A2), and of a connecting gear unit (16) having a gear means compartment (52), a first terminal member (18a) connected for common rotation with said first rotor means (12a) about said first rotor axis (A1), a second terminal member (24) in driving connection with said second rotor means (68c) and transmission-ratio-changeable transmission gear means (18) within said gear means compartment (52), operating circuitry means having a plurality of circuit components (44,80, 46,54,72,80p) allocated to said connecting gear unit (16), an internal group (44,80,46) of said circuit components being accommodated within said gear means compartment (52), an external group (54,72,80p) of said circuit components being provided outside said gear means compartment (52), said external group (54,72,80p) of circuit components being carried by a plate-shaped carrier unit (42) having a main plane (MP) substantially orthogonal with respect to said first rotor axis (A1) and being connected to a stationary compartment confining unit (42a,40) participating in confining said gear means compartment (52), said plate-shaped carrier unit (42) including a plurality of connecting channels (74,76,78,80,84), said connecting channels (74, 76,78,80,84) having longitudinal axes substantially lying in said main plane (MP), said connecting channels (74,76, 78,80,84) connecting respective internal (44,46,80) and external (54,72,80p) circuit components.

2. A combination as set forth in claim 1, said plate-shaped carrier unit (42) having a plate thickness substantially corresponding to the hollow cross-sectional area of said connecting channels (74,76,78, 80,84) increased by the necessary wall thickness of channel confining walls confining said connecting channels (74,76,78,80,84).

3. A combination as set forth in claim 1, said plate-shaped carrier unit (42) being elongate in a direction (B) substantially radial with respect to said first rotor axis (A1), said connecting channels (74,76, 78,80,84) being substantially parallel to each other along at least a part of their respective lengths.

4. A combination as set forth in claim 1, said plate-shaped carrier unit (42) being connected by torque support means (56,58) with said first stator means (10) for preventing rotation of said stationary compartment confining unit (42a,40) about said first rotor axis (A1).

5. A combination as set forth in claim 1, said circuitry means comprising a liquid reservoir chamber (54a), a pump unit (44), a liquid space (80) within said gear means compartment (52), a liquid operated clutch actuation unit (46) within said gear means compartment (52) for actuating a transmission-ratio-change-clutch (32) of said transmission-ratio-changeable transmission gear means (18) and a pump delivery control valve unit (72) for providing a variable pump delivery pressure, said variable pump delivery pressure being operatively connected with said liquid operated clutch actuation unit (46).

6. A combination as set forth in claim 5, said pump unit (44) and said liquid operated clutch actuation unit (46) being provided within said gear means compartment (52), said reservoir chamber (54a), said pump delivery control valve unit (72) and possibly a filter unit (80b) being external circuit components.

7. A combination as set forth in claim 6, a first liquid conducting channel (76) connecting pump delivery means (44c) with inlet means (76a) of said pump delivery control valve unit (72), a second liquid conducting channel (78) connecting outlet means of said pump delivery control valve unit (72) with said gear means compartment (52), a third liquid connecting channel (74) connecting said reservoir chamber (54a) with pump feed means of said pump (44), a fourth liquid conducting channel (80) connecting said liquid space (79) within said compartment (52) with a liquid space (54a) within said reservoir chamber (54a).

8. A combination as set forth in claim 7, a gas exchange channel (84) connecting a liquid free space (52c) of said compartment (52) with a liquid free space (54b) of said reservoir chamber (54a).

9. A combination as set forth in claim 1, at least part of said connecting channels (74,76,78, 80,84) being connected to to respective circuit components by connecting bores (74h,76h,78h,80h,84h) substantially parallel with said first rotor axis (A1).

10. A combination as set forth in claim 1, said first stator-rotor unit (10,12a) having stator wall means (10) substantially orthogonal with respect to said first rotor axis (A1), said gear unit (16) having a first end portion adjacent a side of said stator wall means (10) remote from said first rotor means (12a) and a second end portion on the same side of said stator wall means (10) but more remote therefrom along said first rotor axis (A1), said plate-shaped carrier unit (42) being located adjacent one of said first and second end portions.

11. A combination as set forth in claim 10, external circuit components (54,72,80p) being located on said plate-shaped carrier unit (42) in overlapping relationship with said connecting gear unit (16) along said first rotor axis (A1).

12. A combination as set forth in claim 1, said second terminal member (24) of said connecting gear unit (16) comprising one of a belt pulley (24) and a chain sprocket rotatable about said first rotor axis (A1), a respective closed loop belt or chain connecting said belt pulley (24) or chain sprocket with one of a further belt pulley (66) and chain sprocket, respectively, of said second rotor means (68c), at least part of said external group (54,72,80p) of components is being located inside said closed loop belt or chain, respectively.

13. A combination as set forth in claim 1, said plate-shaped carrier unit (42) comprising a base plate (42b) with the connecting channels (74,76,78,80,84) recessed therein and a cover plate (42c) covering the connecting channels (74,76,78,80,84) of said base plate (42b).

14. A combination as set forth in claim 1, said plate-shaped carrier unit (142) comprising two cover plates (142m,142o) and an intermediate plate (142n) therebetween, said intermediate plate (142n) being provided with slots therethrough, said slots being covered by said cover plates (142m,142o) so as to establish said connecting channels (174,176,178,180,184) in cooperation with said cover plates (142m,142o).

15. A combination as set forth in claim 1, said plate-shaped carrier unit (42) comprising a plurality of sandwiched layer members (42b,42c).

16. A combination as set forth in claim 15, said layer members (42b,42c) being soldered to each other.

17. A combination as set forth in claim 15, said layer members (42b,42c) being bonded to each other by adhesive means.

18. A combination as set forth in claim 15, said layer members (42b,42c) being welded to each other.

19. A combination as set forth in claim 1, said plate-shaped carrier member (42) being exposed to heat exchange with surrounding air.

20. A combination as set forth in claim 15, at least one of said sandwiched layer members being integrally formed with chamber wall means confining at least one of said reservoir chamber and a valve unit chamber.

21. A combination as set forth in claim 15, at least one of said sandwiched layer members (42b,42c) being the result of a non-cutting shaping process, such as casting, die-casting, coining, stamping or deep-drawing.

22. A combination as set forth in claim 1, said first stator-rotor unit (10,12a) being an internal combustion engine, said at least one second stator-rotor unit (68) being an auxiliary power driven unit, such as an electric power generator.

23. A combination as set forth in claim 1, said first stator-rotor unit being an auxiliary power driven unit of an internal combustion engine, said second stator-rotor unit being an internal combustion engine.

24. A combination as set forth in claim 9, at least a part of said connecting bores (74h,76h,78h, 80h,84h) being arranged along a substantially circular arc about said axis (A1).

25. A combination of a first stator unit (10,12a) having first stator means (10) and first rotor means (12a) rotatable about a first rotor axis (A1), of at least one second stator-rotor unit (68) having second stator means (68b) and second rotor means (68c) rotatable about a second rotor axis (A2), and of a connecting gear unit (16) having a gear means compartment (52), a first terminal member (18a) connected for common rotation with said first rotor means (12a) about said first rotor axis (A1), a second terminal member (24) in driving connection with said second rotor means (68c) and transmission-ratio-changeable transmission gear means (18) within said gear means compartment (52), operating circuitry means having a plurality of circuit components (44,80,46,54,72,80p) allocated to said connecting gear unit (16), an internal group (44,80,46) of said circuit components being accommodated within said gear means compartment (52), an external group (54,72,80p) of said circuit components being provided outside said gear means compartment (52), said external group (54,72,80p) of circuit components being carried by a plate-shaped carrier unit (42) having a main plane (MP) substantially orthogonal with respect to said first rotor axis (A1) and being connected to a stationary compartment confining unit (42a,40) participating in confining said gear means compartment (52), said plate-shaped carrier unit (42) including a plurality of connecting channels (74,76,78,80,84), said second terminal member (24) of said connecting gear unit (16) comprising one of a belt pulley (24) and a chain sprocket rotatable about said first rotor axis (A1), a respective closed loop belt or chain connecting said belt pulley (24) or chain sprocket with one of a further belt pulley (66) and chain sprocket, respectively, of said second rotor means (68c), at least part of said external group (54,72,80p) of components being located inside said closed loop belt or chain, respectively.

26. For a combination of a first stator-rotor unit (10,12a) having first stator means (10) and first rotor means (12a) rotatable about a first rotor axis (A1), of at least one second stator-rotor unit (68) having second stator means (68b) and second rotor means (68c) rotatable about a second rotor axis (A2), and of a connecting gear unit (16) having a gear means compartment (52), a first terminal member (18a) connected for common rotation with said first rotor means (12a) about said first rotor axis (A1), a second terminal member (24) in driving connection with said second rotor means (68c) and transmission-ratio-changeable transmission gear means (18) within said gear means compartment (52), operating circuitry means having a plurality of circuit components (44,80,46,54,72,80p) allocated to said connecting gear unit (16), an internal group (44,80,46) of said circuit components being accommodated within said gear means compartment (52), an external group (54,72,80p) of said circuit components being provided outside said gear means compartment (52), said external group (54,72,80p) of circuit components being carried by a plate-shaped carrier unit (42) having a main plane (MP) substantially orthogonal with respect to said first rotor axis (A1) and being connected to a stationary compartment confining unit (42a,40) participating in confining said gear means compartment (52), said plate-shaped carrier unit (42) including a plurality of connecting channels (74,76,78,80,84), said connecting channels (74,76,78,80,84) having longitudinal axes substantially lying in said main plane (MP), said connecting channels (74,76,78,80,84) connecting respective internal (44,46,80) and external (54,72,80p) circuit components, a connecting gear unit (16) having a gear means compartment (52), a first terminal member (18a) connectable for common rotation with said first rotor means (12a) about said first rotor axis (A1), a second terminal member (24) connectable for common rotation with said second rotor means (68c) and transmission-ratio-changeable transmission gear means (18) within said gear means compartment (52), said external group (54,72,80p) of circuit components being carried by a plate-shaped carrier unit (42) having a main plane (MP) substantially orthogonal with respect to said first rotor axis (A1) and being connected or connectable to a stationary compartment confining unit (42a,40) participating in confining said gear means compartment (52), said plate-shaped carrier unit (42) including a plurality of connecting channels (74,76,78,80,84), said connecting channels (74,76,78,80,84) having longitudinal axes substantially lying in said main plane (MP).

27. A combination as set forth in claim 9, said connecting channels (74,76,78,80,84) having end portions adjacent said first rotor axis, said end portion diverging towards said first rotor axis (A1).

* * * * *